May 7, 1963
R. JOHNSON ETAL
3,088,800
DISSOLUTION OF URANIUM FUELS BY MONO- OR
DIFLUOROPHOSPHORIC ACID
Filed Aug. 30, 1961
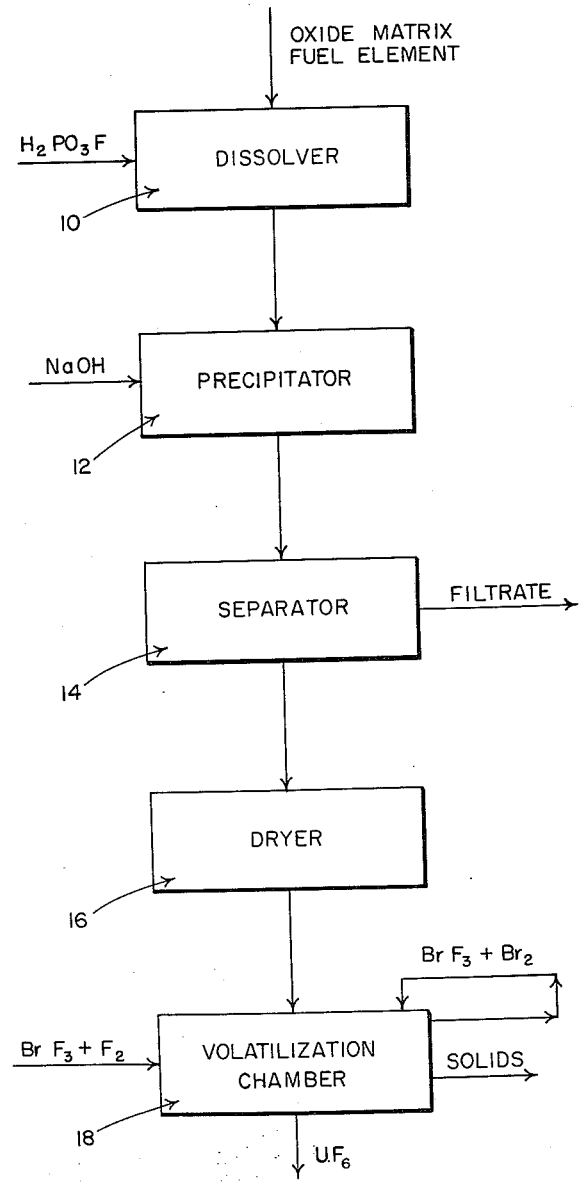
INVENTORS
RICHARD JOHNSON
FREDERICK L. HORN
BY GERALD STRICKLAND

United States Patent Office 3,088,800
Patented May 7, 1963

3,088,800
DISSOLUTION OF URANIUM FUELS BY MONO-
OR DIFLUOROPHOSPHORIC ACID
Richard Johnson, Shoreham, Frederick L. Horn, Sayville, and Gerald Strickland, Blue Point, N.Y., assignors to the United States of America as represented by the United States Atomic Energy Commission
Filed Aug. 30, 1961, Ser. No. 135,085
1 Claim. (Cl. 23—14.5)

This invention relates to the recovery of uranium from nuclear fuels and more particularly to a method of dissolving fuel elements in which the uranium is in an oxide matrix.

Recent developments in nuclear reactor design have tended toward the use of oxide matrix or ceramic type fuel elements which have the ability to withstand use at higher temperatures than metallic fuel elements. Such fuel elements are generally fabricated by powder metallurgy techniques, which include pressing prepared oxide powders into a compact followed by sintering to develop mechanical strength. Such fuel elements generally are not adaptable to the normal aqueous fuel reprocessing procedures which were developed primarily for use with metallic type fuel elements.

The recognized deficiencies of existing aqueous fuel reprocessing methods, which result in large quantities of radioactive waste requiring long-term storage and which necessitate extensive modification of process conditions to handle even the existing types of metallic fuel elements employing zirconium cladding, stainless steel cladding, and the like have spurred investigation of nonaqueous methods and several processes have been developed using nonaqueous liquid solvents. U.S. Patent No. 2,830,873, dated April 15, 1956, discloses a nonaqueous halogen fluoride in the liquid phase. Another process, having particular advantages for the dissolution of nuclear fuel elements incorporating a zirconium or a zirconium alloy cladding, is disclosed in co-pending U.S. patent application S.N. 804,553, filed April 6, 1959, now U.S. Patent 3,012,849, issued December 12, 1961. In the process of the co-pending patent application the initial step comprises dissolving the nuclear fuel element in the liquid phase of a nonaqueous medium comprising an acid fluoride and a complexing agent. Oxide matrix fuel elements do not dissolve in the halogen fluoride dissolution solution of U.S. Patent 2,830,873. Although oxide matrix fuel elements do dissolve in some of the dissolution media disclosed in S.N. 804,553, it has now been discovered that the presence of the complexing agents disclosed in the therein disclosed dissolution media is not essential for dissolution of oxide matrix fuel at a satisfactory rate when certain of the disclosed acid fluorides are employed as solvents.

Although oxide matrix fuel elements are not dissolved by hydrogen fluoride, either monofluorophosphoric acid or difluorophosphoric acid is capable of dissolving refractory fuel elements even in the absence of added complexing agent. This completely unexpected discovery now makes possible a simplified processing method for the separation and recovery of uranium from fuel elements in which oxides of uranium are associated with materials comprising the oxides of beryllium and the oxides of thorium.

A particular object of this invention is to provide a new, novel, and simple dissolution step in a process for the separation and recovery of uranium from oxide matrix fuel elements containing uranium. A further object of this invention is to provide a dissolution step for the separation and recovery of uranium from oxide matrix fuel elements containing uranium, which dissolution step is compatible with known volatility methods for the isolation and purification of uranium. A still further object of this invention is to provide for the dissolution of oxide matrix fuel elements in a readily controllable reaction at relatively moderate temperature and pressure. A still further object of this invention is to provide a process in which the dissolution of oxide matrix fuel elements is accomplished in process vessels made of inexpensive, readily available materials of construction.

According to the present invention therefore, in a process for the recovery of uranium and its separation from fission products, neutron capture products, and other components of an oxide matrix fuel element, the uranium can be recovered conveniently by a method the initial step of which comprises dissolving the oxide matrix fuel element in the liquid phase of a solvent comprising an acid fluoride selected from the group consisting of monofluorophosphoric acid and difluorophosphoric acid. This dissolution step completely disperses the components of the fuel element and conditions the components in a manner, at present not entirely understood, which makes them amendable to treatment with known volatility agents in a subsequent step of a process for the separation and removal of uranium as a volatile fluoride. Whereas the oxide matrix fuel element is initially substantially inert to interhalogens such as bromine trifluoride, the dissolved components after precipitation by neutralization with a suitable basic material are reactive and the uranium content of the fuel element can be recovered by treating the dried precipitate with an interhalogen followed by vaporization and distillation to recover the uranium from fission products and impurities. The nonvolatile residue substantially free of uranium is a convenient dry solid form which is advantageous for further treatment if desired to extract one or more of its components or for ultimate waste disposal.

For a full and more complete understanding of the invention, reference is made to the following description and accompanying block diagram flowsheet which illustrates but does not limit the practice of this invention. In a dissolver 10 the oxide matrix fuel elements containing uranium are dissolved in the liquid phase of a solution in which an acid fluoride, represented by anhydrous monofluorophosphoric acid, is the essential active ingredient. In this step, which is carried out in a copper vessel at a temperature in the range of from 150–275° C., substantially all the components of the fuel element enter into solution and become conditioned for treatment in subsequent steps. The monofluorophosphoric acid solution is then neutralized in precipitator 12 with sodium hydroxide. Uranium and other components which are insoluble in neutral aqueous systems are precipitated.

The solids from the precipitator 12 are filtered in separator 14, washed to remove adherent soluble ionic matter and then dried in dryer 16, in preparation for volatilization in volatilization chamber 18. In volatilization chamber 18 the dried solids resulting from the dissolution of the oxide matrix fuel elements are fluorinated by known methods using interhalogen fluorination agents as is well known in the art. In the block diagram, bromine trifluoride is shown as the interhalogen, and fluorine is added to combine with the bromine formed during the fluorination reaction, as shown by the recycle stream. After treatment with the fluorination agent is complete, the excess interhalogen and the uranium can be volatilized by known methods and fractionally distilled to recover the uranium as its hexafluoride, as shown. If plutonium is present in the fuel element, the residue after uranium volatilization can be treated by methods well known in the art as, for example, with fluorine at an elevated temperature to volatilize and recover the plutonium. Other constituents in the residue can be separated and recovered by appropriate treatment if desired.

The described process is illustrated by the following examples in which laboratory-scale and small batch equipment is used. It should be understood, however, that these examples are intended to be illustrative only of the scope of the invention and are in no way limiting.

The first example demonstrates that a thorium oxide-uranium oxide fuel pellet will dissolve in a solvent of this invention.

EXAMPLE I

Thorium oxide—uranium oxide ($ThO_2$—$UO_2$) fuel pellets having the approximate dimensions 0.27 inch diameter, 0.75 inch length and weighing about 6.5 grams were measured to determine the surface area and weighed to determine the initial weight prior to immersion in a measured volume of difluorophosphoric acid for a predetermined time period in a series of tests to ascertain the effect of the temperature during the dissolution upon dissolution rate as calculated from weight loss. These fuel pellets, containing about 2.58% uranium, which had been sintered but had not been irradiated were representative of fuel to be used in the Indian Point power reactor. The results of the dissolution rate determination are presented in Table 1.

*Table 1*

DISSOLUTION OF $ThO_2$—$UO_2$ IN $HPO_2F_2$
[Monel Metal Container]

| Volume of Solution, Area of pellet, ml./cm.$^2$ | Av. Temp., °C. | Time of Exposure, Min. | Area, cm.$^2$ | Dissolution Rate, mg./cm.$^2$-min. |
| --- | --- | --- | --- | --- |
| 11.5 | 210 | 60 | 2.6 | 0.3 |
| 11.5 | 215 | 60 | 2.6 | 1.0 |
| 9.75 | 255 | 120 | 4.1 | 1.6 |
| 12 | 190 | 162 | 2.5 | 0.4 |
| 12.5 | 220 | 60 | 2.4 | 0.4 |

The vapor pressure at 255° C. was approximately 200 pounds per square inch above atmospheric. The above dissolutions were carried out in a Monel metal reaction vessel which corroded appreciably at a rate of about 0.2 mg./cm.$^2$-min at 220° C.

This example indicates that sintered $ThO_2$–$UO_2$ fuel pellets can be dissolved in difluorophosphoric acid, albeit at a slow rate of about 1 mg./cm.$^2$-min in a temperature range of about 200 to 250° C. Further, this example indicates, as seen from Table 1, that Monel metal is not a completely satisfactory material of construction for use with difluorophosphoric acid in this temperature range.

In the next example aluminum is used for the solution container because of the belief that insoluble corrosion products resulting from attack on the Monel metal had an adverse influence on the dissolution rate.

EXAMPLE II

Sintered $ThO_2$—$UO_2$ fuel pellets from the same lot as used in Example I were measured, weighed, immersed in $HPO_2F_2$ for a predetermined period of time, removed, dried, reweighed, and the dissolution rate computed. The results are shown in Table 2.

*Table 2*

DISSOLUTION OF $ThO_2$—$UO_2$ IN $HPO_2F_2$
[Aluminum Container]

| Volume of Solution, Area of pellet, ml./cm.$^2$ | Av. Temp., °C. | Time of Exposure, Min. | Dissolution Rate, mg./cm.$^2$-min. |
| --- | --- | --- | --- |
| 8.65 | 215 | 60 | 1.2 |
| 9.2 | 210 | 240 | 0.6 |

These results confirm the dissolution rates of Example I and indicate further that the dissolution rate may be decreased during long exposure periods because of build-up container material corrosion products.

The next example illustrates the temperature effect upon dissolution rate using a copper-lined vessel as the solvent container.

EXAMPLE III

Sintered $ThO_2$—$UO_2$ fuel pellets from the same lot as used in the earlier Examples were subjected to the dissolution rate determination test as described in the earlier Examples, using a copper-lined vessel to contain the solvent. About 9 milliliters of solvent was used for each square centimeter of initial pellet surface. Table 3 gives the results.

*Table 3*

DISSOLUTION OF $ThO_2$—$UO_2$ IN $HPO_2F_2$
[Copper-lined Container]

| Av. Temp., °C. | Time of Exposure, Min. | Dissolution Rate, mg./cm.$^2$-min. |
| --- | --- | --- |
| 210 | 60 | 4.2 |
| 235 | 60 | 1.8 |

These results indicate that the dissolution rate in a copper-lined vessel is greater than that when Monel metal or aluminum is used as the material of construction. The reason for the apparent two-fold reduction of dissolution rate with increasing temperature in this example is not understood, and possibly could be an experimental error.

The next example illustrates the improvement in dissolution rate obtained through the use of monofluorophosphoric acid as the solvent, the effects of different container materials, and the effect of temperature upon the dissolution rate.

EXAMPLE IV

Fuel pellets similar to those used in the previous examples were subjected to the dissolution rate determination of the earlier examples using monofluorophosphoric acid as the dissolution medium. A variety of different container materials was tested with the results as shown in Table 4, wherein about 9 milliliters of solution was used for each square centimeter of initial pellet surface.

*Table 4*

DISSOLUTION OF $ThO_2$—$UO_2$ IN $H_2PO_3F$

| Container Material | Av. Temp., °C. | Time of Exposure, Min. | Dissolution Rate, mg./cm.$^2$-min. |
| --- | --- | --- | --- |
| Borosilicate glass | 160 | 60 | 2.6 |
| Do | 165 | 60 | 3.3 |
| Do | 170 | 60 | 2.1 |
| Aluminum | 210 | 55 | 4.3 |
| Do | 260 | 60 | 5.5 |
| Do | 260 | 240 | 2.4 |
| Copper | 167 | 30 | 10. |
| Do | 215 | 60 | 22. |
| Do | 240–255 | 30 | 50. |
| Do | 260 | 60 | >44. |
| Do | 210 | 60 | 19. |

The penultimate tabulated dissolution rate was determined with a fuel pellet which had been partially dissolved in a previous test and has a diameter of 0.228 inch. The pellet dissolved completely in this test. The final tabulated dissolution rate was determined with a solution made up in the volumetric ratio of 1 part water to 8 parts $H_2PO_3F$.

Comparison of the dissolution rate in monofluorophosphoric acid, as illustrated in Table 4, with the dissolution rate in difluorophophoric acid for comparable time and temperature in a comparable container material is possible when reference is made to the 60 minute exposure value tabulated in Example II. A dissolution rate of 4.3 mg./cm.$_2$-min. in the present example compares favorably with a rate of 1.2 mg./cm.₂-min. and in indicative of the superiority of monofluorophosphoric acid when compared with difluorophosphoric as a solvent for this type oxide matrix fuel element.

A further direct comparison of the dissolution rates of the two solvents is obtained by comparison of the first value of Table 3 with the rate obtained in this example for the dissolution at 215° C. and 210° C. in a copper container. The dissolution rate for monofluorophosphoric acid, in this comparison, appears to be about 5 times that of difluorophosphoric acid.

These results also clearly illustrate that for the different materials of construction the dissolution rate is greater in a copper vessel.

These results also indicate the favorable effect of increased temperature upon dissolution rate, in the range tested, and that water, when present in about 11% concentration by volume, has no adverse effect on the dissolution rate.

The next example is an illustration of a method for isolating and recovering uranium from a thorium oxide-uranium oxide fuel element dissolved according to the method of the present invention.

EXAMPLE V

A $ThO_2$-$UO_2$ fuel pellet was dissolved in about 8.0 to 8.4 milliliters of anhydrous $H_2PO_3F$ in a copper vessel. Upon completion of the dissolution the acidity of the solution was neutralized by the addition of an aqueous solution of sodium hydroxide, precipitating the dissolved thorium and uranium. The precipitate was first filtered to separate it from the bulk of the solution and then dried prior to contacting it with 10 milliliters of bromine trifluoride ($BrF_3$), a known fluorination agent commonly used in the recovery of uranium by volatilization of uranium hexafluoride. After a contacting period the solids and fluorination agent were heated to evaporate away the volatile material, which was collected in a suitable condenser. Analyses for uranium of the material retained in the residue and the material collected in the condensate were used to compute the percent recovery of the uranium according to the following equation:

$$\text{Percent uranium recovery} = 100 - \frac{\text{uranium in residue}}{\text{uranium in residue} + \text{uranium in condensate}} \times 100$$

Calculated according to this equation, greater than 99.8% recovery of uranium was achieved in the precipitation, filtration, fluorination, and volatilization process as described, wherein 86 milligrams of uranium was found in the condensate and less than 0.15 milligram of uranium was found in the residue.

In a similar process the hydrous oxides formed by the precipitation of the dissolved thorium and uranium upon neutralization with aqueous sodium hydroxide were made soluble with 1.6 normal nitric acid, yielding a solution from which Thorex feed could be prepared.

This example shows that uranium, contained in the solution resulting from the dissolution of $ThO_2$-$UO_2$ fuel pellets in a solvent of this invention, can be recovered in high yield by known methods.

The dissolution of another oxide matrix fuel element, beryllium oxide-uranium oxide (BeO-$_3O_8$ and Be-U oxide) in a solvent of this invention is shown by the following example.

EXAMPLE VI

A piece of pre-fired BeO—$U_3O_8$ containing 10% uranium, having a maximum thickness of 0.113 inch and weighing 0.62 gram and a second 0.17 gram piece of an oxide material containing BeO and about 6% uranium as uranium oxide and having a maximum thickness of 0.070 inch were both completely dissolved in one half hour in anhydrous monofluorophosphoric acid at approximately 200° C. The dissolved material remained in solution even after cooling to room temperature.

EXAMPLE VII

Although the solvents of this invention are useful primarily in the dissolution of oxide matrix fuel elements in processes for the recovery of fissionable material, other materials have been tested and found soluble therein at significantly high rates to make these solvents attractive in the recovery of scrap from the fabrication of manufactured articles or the dissolution of cladding from nuclear fuel elements. The following materials have been tested and found to have significant dissolution rates, as seen from Table 5, in anhydrous monofluorophosphoric acid in the temperature range from about 150° to 275° C.: Uranium carbide, stainless steel (alloy 304), nickel, Inconel (a nickel alloy), zirconium, Zircaloy-2 (a zirconium-tin alloy), beryllium oxide, beryllium, thorium, and uranium dioxide. Methods for recovery of the material from solution in this solvent will be obvious to those skilled in the art.

Table 5

DISSOLUTION RATES OF REACTOR FUELS AND MATERIALS IN ANHYDROUS $H_2PO_3F$ ᵃ

| Material | Amount dissolved (grams) | Temp. (° C) | Dissolution rate (mg./cm.²-min.) | Penetration rate (mils/hr.) |
|---|---|---|---|---|
| $ThO_2$-$UO_2$ ᵇ | 1.92 | 200 | 16 | 40 |
| $ThO_2$-$UO_2$ ᵇ | 3.83 | 240-255 | 50 | 125 |
| $ThO_2$-$UO_2$ ᵇ | 10.14 | 216-255 | 18 | ᶜ 45 |
| U | 2.98 | 215 | 34 | 43 |
| $UO_2$ | 8.42 | 220 | 24 | 52 |
| UC | 3.42 | 210 | >21 | ᵈ >37 |
| Be | 0.11 | 200-215 | >1.5 | ᵈ >20 |
| BeO-$U_3O_8$ | 2.07 | 211 | 8 | 64 |
| Zr-2 | 0.64 | 260-275 | 3.6 | 13 |
| 304 stainless steel | 1.85 | 250 | 7 | 21 |
| Al | 0.46 | 208-226 | 1.9 | 17 |

ᵃ 40-45 ml. $H_2PL_3F$ for 30 or 60 minutes.
ᵇ 92-94% of theoretical density, 2.9-6.5% $UO_2$.
ᶜ 30 ml. of $H_2PO_3F$.
ᵈ Specimen dissolved completely.

Depending upon the economics involved, it may be an advantage to remove the monofluorophosphoric acid dissolution solvent. An alternative method for the practice of this invention would be therefore, to convert the monofluorophosphoric acid from dissolver 10 to difluorophosphoric acid by known methods, as for example by treatment with hydrogen fluoride and/or phosphoryl fluoride, followed by vaporization of the difluorophosphoric acid. The monofluorophoshoric acid can then be recovered by reconverting the evolved difluorophosphoric acid using a reaction with water as is known in the art. However, if the advantage of separation and recovery of excess solvent by volatilization is desired, difluorophosphoric acid can be used in the dissolution step with the result that the dissolution reactions will require a longer time to reach completion and provision must be made for maintaining a positive pressure on the solvent to prevent vaporization and consequent loss of solvent during the dissolution step. These economic factors and their consequences will be obvious to chemical engineers of normal skill in the art.

Since many embodiments might be made of the present invention and since many changes might be made in the embodiment described, it is to be understood that the foregoing description is to be interpreted as illustrative only and not in a limiting sense.

What is claimed is:

A method for dissolving and separating uranium from a uranium matrix fuel element consisting of the steps of dissolving said fuel element in a liquid solvent heated in the range of from 150-275° C. comprising an acid fluoride selected from the group consisting of monofluorophosphoric acid and difluorophosphoric acid, neutralizing said solution with a basic solution to precipitate uranium solids, converting said uranium solids to uranim hexafluoride by treating said solids with a halogen trifluoride to obtain uranium hexafluoride and thereafter volatilizing and recovering said uranium hexafluoride.

References Cited in the file of this patent

UNITED STATES PATENTS

| | | |
|---|---|---|
| 2,830,873 | Katz et al. | Apr. 15, 1958 |
| 2,859,092 | Bailes et al. | Nov. 4, 1958 |
| 3,012,849 | Horn | Dec. 12, 1961 |

OTHER REFERENCES

Reactor Fuel Processing, vol. 2, No. 1, pp. 22, 23, January 1959.